United States Patent
Toyozumi

[19]

[11] Patent Number: 6,130,727

[45] Date of Patent: Oct. 10, 2000

[54] ON-VEHICLE UNIT

[75] Inventor: Morihiko Toyozumi, Nagoya, Japan

[73] Assignees: Harness System Technologies Research, Ltd., Nagoya; Sumitomo Wiring Systems, Ltd., Mie; Sumitomo Electric Industries, Ltd., Osaka, all of Japan

[21] Appl. No.: 09/199,284

[22] Filed: Nov. 25, 1998

[30] Foreign Application Priority Data

Dec. 18, 1997 [JP] Japan ..................................... 9-349317

[51] Int. Cl.[7] .............................. H04N 5/64; A47B 81/06
[52] U.S. Cl. .......................... 348/837; 312/7.1; 445/345
[58] Field of Search ................................... 348/836, 837; 312/7.2, 223.1, 223.2, 7.1; 455/99, 345, 347, 348, 349; 296/70; 180/90; 369/11, 12

[56] References Cited

U.S. PATENT DOCUMENTS

| | | | |
|---|---|---|---|
| 4,479,263 | 10/1984 | Rosenfeldt et al. | 312/7.1 X |
| 4,513,405 | 4/1985 | Hills | 455/347 X |
| 4,635,110 | 1/1987 | Weinblatt | 348/837 |
| 5,199,772 | 4/1993 | Jordan | 312/7.1 |
| 5,204,971 | 4/1993 | Takahashi et al. | 455/345 X |
| 5,259,655 | 11/1993 | Anderson | 296/70 |
| 5,797,088 | 8/1998 | Stamegna | 455/345 |
| 5,815,468 | 9/1998 | Muramatsu et al. | 369/12 X |

*Primary Examiner*—Peter M. Cuomo
*Assistant Examiner*—James O. Hansen
*Attorney, Agent, or Firm*—Oliff & Berridge, PLC

[57] ABSTRACT

There is described an on-vehicle unit which permits removal and attachment of various optional modules from and to a center module and which enables easy addition and removal of various functions. The on-vehicle unit is provided in a dashboard of a vehicle, and a center module—into which there are built as standard devices a radio receiving unit and a car navigation unit—has a plurality of module loading sections. Optional modules, such as a television tunermodule, a cassette deck module, and a VICS module, can be built into the center module, as required. The center module (7) has a central control section for controlling the standard units and various optional modules. The control mode of the control section is switched according to a combination of optional modules to be built into the center module.

19 Claims, 7 Drawing Sheets

ON-VEHICLE UNIT

BACKGROUND OF THE INVENTION

The present invention relates to an on-vehicle electronic device which is installed on a dashboard of the vehicle and includes a car navigation system or the like.

With regard to conventional on-vehicle units, individual units such as a radio, a television set, a cassette deck, a CD player, a car navigation system, and a VICS (Vehicle Information and Communications System), are formed so as to be independent of one another. These units are installed on a dashboard while assembled.

Types of unit combinations are determined beforehand by the manufacturer, and the user purchases a vehicle in which there are assembled units, such as a radio, selected from the predetermined types of units.

Since only a limited number of unit combinations are available from the manufacturer, even if the user attempts to add an additional unit to the vehicle after purchase of the vehicle, in some cases the unit may not be installed because of the limitation of an installation space. Further, in many cases, a unit such as a cassette deck is built into the dashboard in advance, and hence the unit may not be removed.

A unit, such as a VICS, is installed on, e.g., the upper surface of the dashboard apart from a unit housing section provided in the center of the dashboard so as to accommodate many units. In the case of a separate unit such as a VICS, the user experiences inconvenience in using the unit, and additional wiring such as wiring of a power line is also required. In this way, adding a unit to the vehicle is not easy.

SUMMARY OF THE INVENTION

The present invention has been conceived to solve the foregoing problem, and the object of the present invention is to provide an on-vehicle unit which permits removal and addition of various optional modules with respect to the center module and which enables easy addition and removal of various functions.

To this end, according to a first aspect of the present invention, there is provided an on-vehicle unit installed in a vehicle dashboard, the unit comprising: a center module which incorporates therein at least one unit having a predetermined function, has in at least one portion thereof a module loading section, and permits insertion or removal of at least one type of optional module having a predetermined function differing from the function of the built-in unit; input receiving means which is provided in the center module and receives predetermined inputs by way of operation; and central control means which is provided in the center module and controls the unit built into the center module and the optional module inserted into the module loading section, according to an operation input entered by way of the input receiving means.

According to the first aspect of the present invention, various functions can be readily added to or removed from the on-vehicle unit by solely removal or attachment of an optional module to the center module.

Further, since optional modules are built into all the module loading section of the center module. Therefore, even if an addition function is added to the on-vehicle unit, there is no need to provide new wiring to the on-vehicle unit, which would otherwise required by the conventional on-vehicle unit requiring additional units. Therefore, functions can be readily added to the on-vehicle unit.

More preferably, according to the second aspect of the invention, the type of optional module to be inserted into the module loading section is determined beforehand for each module loading section, and the on-vehicle unit further comprises module detection means for detecting removal and insertion of the corresponding optional module from and into the module loading section of the center module. Further, the central control means has a plurality of control modes which can be switched according to the presence or absence of the optional module in the module loading section as well as according to the combination of the optional modules to be inserted into the module loading section. On the basis of a signal delivered from the module detection means, the central control means recognizes absence or presence of the optional module in the module loading section and the combination of optional modules inserted into the module loading section. The control mode of the central control means should preferably be switched to a control mode corresponding to the result of recognition, from among the plurality of control modes.

Accordingly, the removal and attachment of an optional module from and to a module loading section is detected by the module detection means. In association with removal and attachment of an optional module to the center module, the control mode of the central control means is switched to a corresponding control mode, according to the presence or absence of the optional module as well as according to the combination of optional modules built into the module loading sections.

More preferably, according to the third aspect of the invention, in addition to the input receiving means, the on-vehicle unit further comprises input means which causes the central control means to recognize the presence or absence of the optional module in the module loading section and the combination of optional modules inserted into the module loading section. Further, the central control means has a plurality of control modes which can be switched according to the presence or absence of the optional module in the module loading section as well as according to the combination of the optional modules to be inserted into the module loading section. On the basis of a signal delivered from the module detection means, the central control means recognizes absence or presence of the optional module in the module loading section and the combination of optional modules inserted into the module loading section. The control mode of the central control means should preferably be switched to a control mode corresponding to the result of recognition, from among the plurality of control modes.

Accordingly, the control mode of the central control means can be switched in association with the removal and attachment of an optional module by way of input means specifically designed for switching purposes. Therefore, the control mode can be readily switched.

More preferably, according to fourth aspect of the present invention, the central control means has a plurality of control modes which can be switched according to the presence or absence of the optional module in the module loading section as well as according to the combination of the optional modules to be inserted into the module loading section. Further, a plurality of mode switch operations, which are to be input by way of the input receiving means for the purpose of switching the control mode, are registered in the central control means in advance. In response to the mode switch operation entered by way of the input receiving means, the control mode should preferably be switched to the control mode corresponding to the input content, from among the plurality of control modes.

Accordingly, the control mode of the central control means can be switched in association with removal and attachment of the optional module from and to the center module, by way of input receiving means for activating the unit built into the center module and the optional module inserted into the module loading section. Accordingly, there is no need to provide the on-vehicle unit with input means specifically designed for switching the control mode of the central control means, thus simplifying the configuration of the on-vehicle unit.

More preferably, according to the fifth aspect of the present invention, the input receiving means have a plurality of input keys which are allocated, by means of the central control means, to predetermined activating for the purposes of activating the unit incorporated into the center module and the optional module built into the module loading section. The central control means should preferably change the instructions to the individual input keys in association with switching of the control mode, according to the presence or absence of the optional module in the module loading section as well as according to the combination of the optional modules to be inserted into the module loading section.

Accordingly, an instruction assigned to the input key of the input receiving means is changed in association with switching of the control mode according to the presence or absence of the optional module in the module loading section as well as according to the combination of the optional modules built into the module loading sections. Accordingly, even if the optional modules are added to or removed from the on-vehicle unit, the units built into the center module and the optional modules can be operated through input keys without changing the number of input keys provided in the input means and the layout of the input keys.

More preferably, according to the sixth aspect of the present invention, the on-vehicle unit further comprises display means whose display is controlled by means of the central control means. The central control means should preferably indicate on the display means the instructions assigned to the individual keys so as to correspond to the layout of the input keys.

Accordingly, the instruction assigned to each input key is indicated on display means so as to correspond to the key layout. Accordingly, even when the instruction assigned to the input key is changed in association with removal or attachment of the optional module from and to the center module, the on-vehicle unit can cope with such a change in the instruction by only changing display contents indicated on the display means.

More preferably, according to seventh aspect of the present invention, the instruction assigned to each input key should preferably be written on an actuation section removably attached to the body of each input key.

Accordingly, when the instruction assigned to the input key is changed in association with the removal and attachment of the optional module from and to the center module, the on-vehicle unit can cope with a change in the instruction by only replacing the actuation section with another actuation section on which a post-change instruction is written.

More preferably, according to the eighth aspect of the present invention, a seal on which is written the instruction attached to the input key is affixed onto the actuation section of each input key or the circumference of each input key.

Accordingly, when the instruction assigned to the input key is changed in association with the removal and attachment of the optional module from and to the center module, the on-vehicle unit can readily cope with such a change in the instruction by only replacing a seal affixed onto the actuation section of each input key or the surrounding area of the input key with another seal on which a post-change instruction is written.

More preferably, according to the ninth aspect of the present invention, the units built in the center module are a radio tuner unit having the function of receiving a radio broadcast and a navigation unit having the function of performing a predetermined road guiding operation. As the optional module, there are available a television tuner module having the function of receiving a television broadcast, a cassette deck module having the function of reproducing information recorded on a cassette tape, a VICS module having the function of receiving VICS information transmitted from the outside of the car, and a CD player module having the function of reproducing the information recorded on a CD such as music. The center module has a plurality of module loading section capable of receiving these optional modules.

DESCRIPTION OF THE PREFERRED EMBODIMENTS

Figure 1:
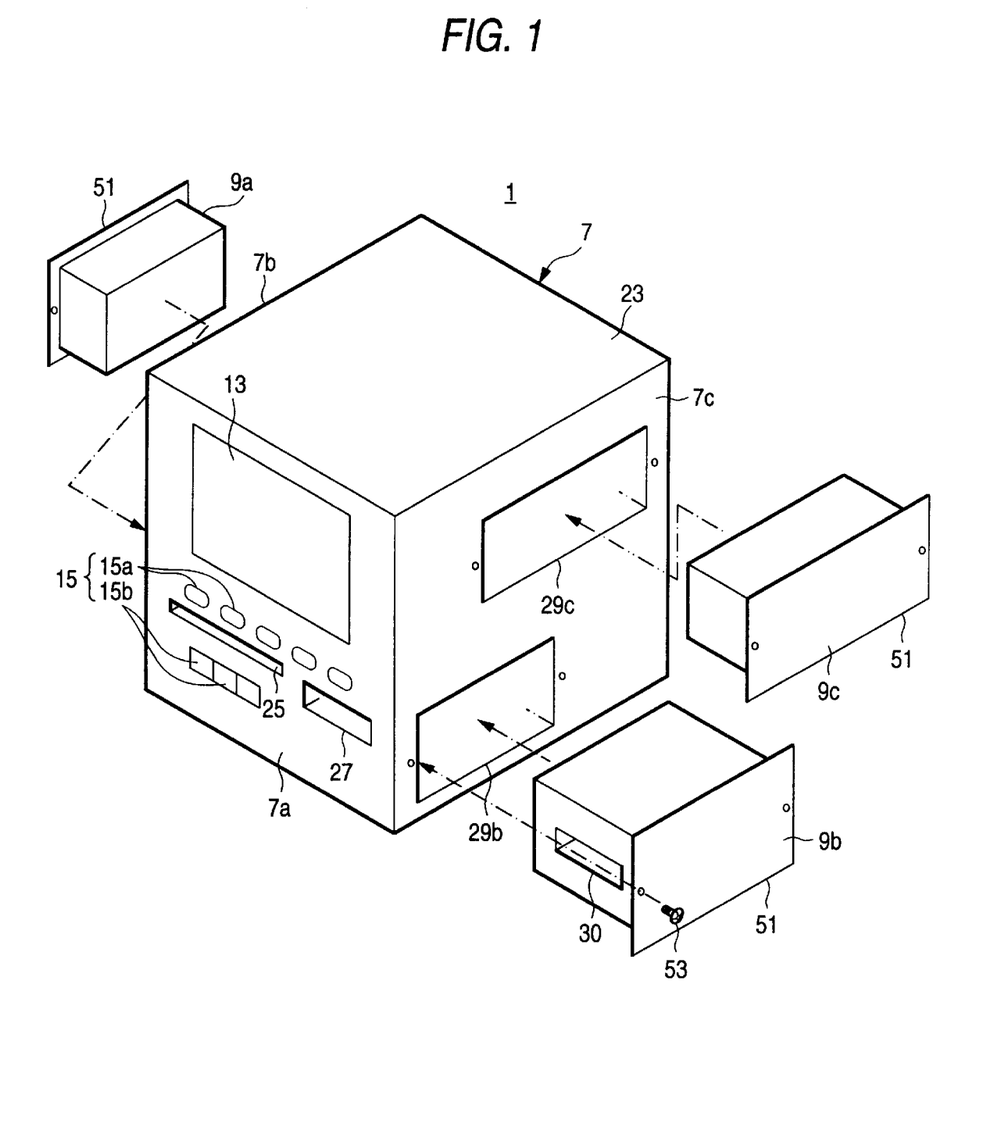
FIG. 1 a perspective view showing the configuration of an on-vehicle unit according to a first embodiment of the present invention.
Figure 2:
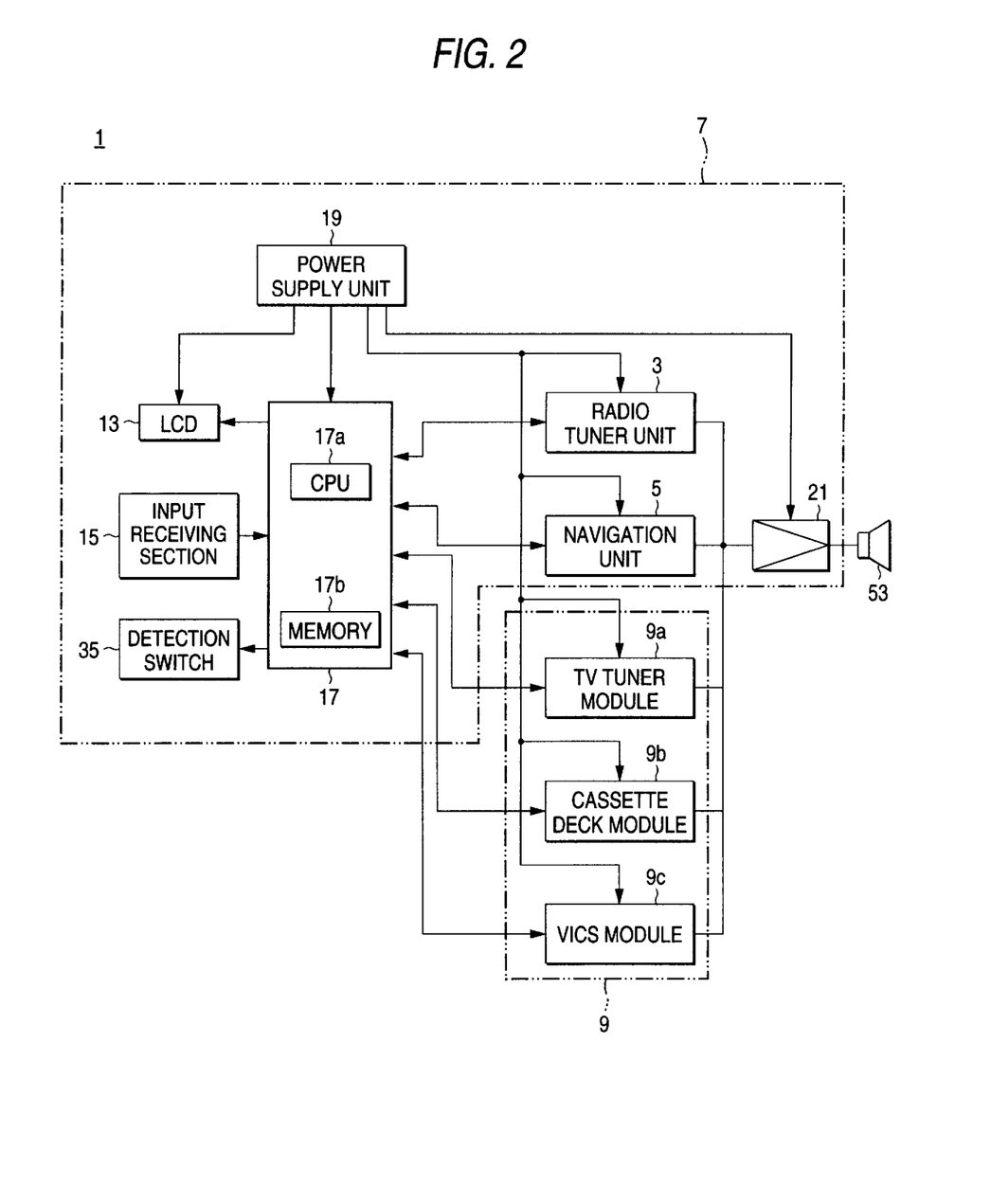
FIG. 2 is a block diagram showing the on-vehicle unit according to the first embodiment.
Figure 3:
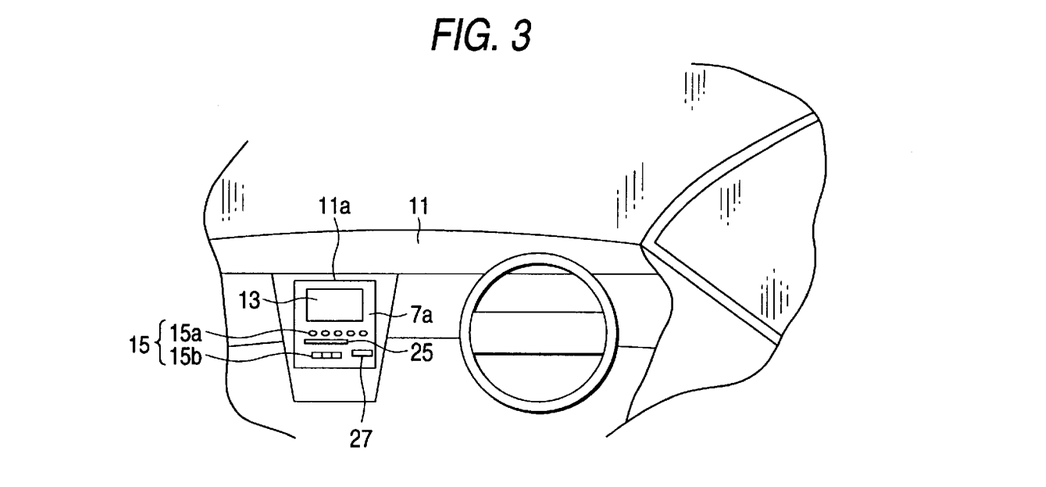
FIG. 3 is a diagrammatic representation showing the on-vehicle unit is inserted into a unit housing section of the dashboard.

FIG. 1 is a perspective view showing the configuration of an on-vehicle unit according to a first embodiment of the present invention, and FIG. 2 is a block diagram of the on-vehicle unit. An on-vehicle unit 1 primarily comprises a radio receiving unit 3 and a center module 7 having a car navigation unit 5 incorporated therein. The center module 7 is arranged so as to permit removable incorporation of various optional modules 9, such as a television tuner module 9a, a cassette deck module 9b, a VICS module 9c, and a CD player module (not shown). As shown in FIG. 3, the on-vehicle unit 1 having the foregoing configuration is inserted into a unit housing section 11a formed in the center of the dashboard 11 of the vehicle.

The center module 7 approximately comprises a liquid crystal display section (display means) 13; a input receiving section (input receiving means) 15 having a plurality of input keys 15a and 15b; the radio receiving unit 3; the car navigation unit 5; a central control section (central control means) 17 which controls the liquid crystal display section 13, the radio receiving unit 3, the car navigation unit 5, and the optional modules 9 inserted into the center module 7; a power supply unit 19; an amplifying unit 21; and a casing 23 for housing these sections and units.

On a front surface 7a of the center module 7 facing the driver's seat, there are provided the liquid crystal display section 13, a plurality of input keys 15a and 15b of the input receiving section 15, a CD-ROM insertion port 25 which permits a CD-ROM to be inserted into a CD-ROM drive (not shown) of the car navigation unit 5 provided in the center module 7, and a cassette insertion port 27 which permits insertion of a cassette tape. In a case where the cassette deck module 9b is not inserted into the center module 7, the cassette insertion port 27 is closed with a predetermined covering member (not shown).

A module loading section 29 formed in the center module 7 contains an unillustrated module loading section 29a into which the television tuner module 9a fitted, a module loading section 29b into which the cassette deck module 9b is fitted, and a module loading section 29c into which the VICS module 9c is fitted. The module loading section 29a comprises an opening formed in a left-side surface 7b of the center module 7, and the module loading section 29b comprises an opening formed in a right-side surface 7a of the center module 7. Further, the module loading section 29c comprises an opening formed in the right-side surface 7a. The optional modules 9 are inserted into the respective module loading sections byway of the openings. In a case where the optional modules 9 are not inserted into the module loading sections, the openings are closed with predetermined covering members (not shown).

The cassette insert port 27 formed in the front surface 7a of the center module 7 is situated so as to be in mutual communication with a cassette insert port 30 of the cassette deck module 9 inserted into the module loading section 29b, thereby permitting insertion and removal of a cassette tape by way of the cassette insert port 27.

As shown in FIGS. 4 through 7, within each of the module loading sections 29, there are provided a pair of guide rails 31 and 33 for retaining the optional module 9, a detection switch (module detection means) 35 which detects removal and insertion of the optional module 9 from and into the module loading section 29, and a receiving connector 36 which establishes electrical connection with respect to the optional module 9 loaded in the module loading section 29.

Figure 4:
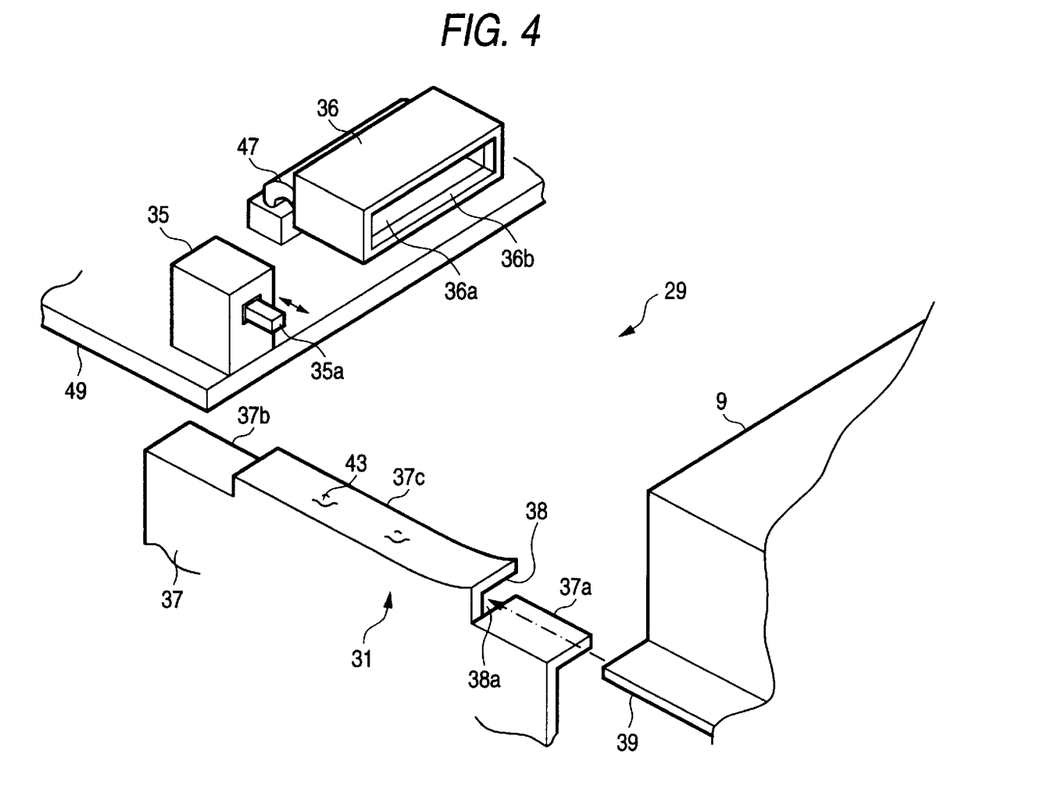
FIG. 4 is a perspective view showing the configuration of a module loading section formed in the center module to be attached to the on-vehicle unit shown in FIG. 1.
Figure 6:
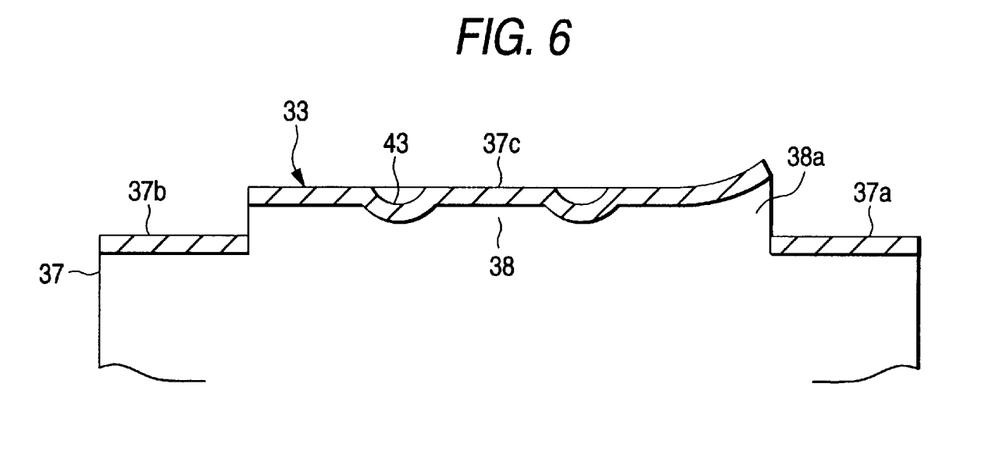
FIG. 6 is a cross-sectional view showing guide rails provided in the module loading section shown in FIG. 4.

Each of the guide rails 31 and 33 is formed by bending, toward the inside of the module loading section 29, the front end of longitudinally-oriented predetermined metal material 39 which is divided into three sub-divisions. Sub-divisions 37a and 37b formed at both ends of the front end portion of the three sub-divisions of the metal material 37 are folded inwardly at right angles so as to be flush with each other.

In contrast, an intermediate sub-division 37c sandwiched between the sub-divisions 37a and 37b is folded so as to be tilted slightly downwardly at an angle greater than 90° at a position higher than the position of the sub-divisions 37a and 37b. A substantially-grooved holding section 38 is made up of the sub-divisions 37a, 37b, and 37c.

Figure 5:
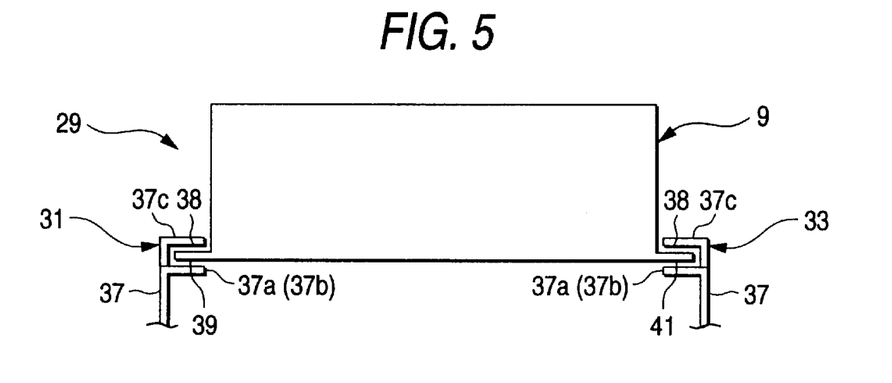
FIG. 5 is a schematic representation showing optional modules loaded in the module loading section shown in FIG. 4.

In contrast, flanges 39 and 41 are formed so as to project outside on respective sides of the optional module 9 when the module 9 is directed in the direction in which it is inserted. Each of the flanges 39 and 41 is inserted into the space between the intermediate sub-division division section 37c and the sub-divisions 37a and 37b, thereby retaining the optional module 9 in the module loading section 29. Although in the present embodiment the flanges 39 and 41 of the optional module 9 are inserted into the respective guide rails 31 and 33, the opposing ends of the circuit board of the optional module 9 may be inserted into the respective guide rails 31 and 33. As mentioned above, the intermediate sub-division 37c of each of the guide rails 31 and 33 is folded and tilted slightly downwardly. When each of the flanges 39 and 41 of the optional module 9 is inserted into the space between the intermediate sub-division 37c and the sub-divisions 37a and 37b, the flanges 39 and 41 are retained while each of the flanges 39 and 41 is brought into pressed contact with the sub-divisions 37a and 37b by means of the intermediate sub-division 37c. As a result, there is prevented rattling of the optional module 9, which would otherwise be caused by vibrations of the vehicle.

In the substantially-grooved retaining section 38 which is provided on each of the guide rails 31 and 33 and is made up of the intermediate sub-division 37c and the subdivisions 37a and 37b, an opening 38a of the retaining section 38—into which each of the flanges 39 and 41 is inserted—is formed so as to fan out to thereby facilitate insertion of the flanges 39 and 41.

In the intermediate sub-division section 37c of each of the guide rails 31 and 33 folded and tilted slightly downwardly, there are formed a plurality of protuberances 43 so as to protrude downwardly. These protuberances 43 effectively press the flanges 39 and 41 downwardly, thereby effectively preventing rattling of the flanges 39 and 41 of the optional module 9.

Figure 7:
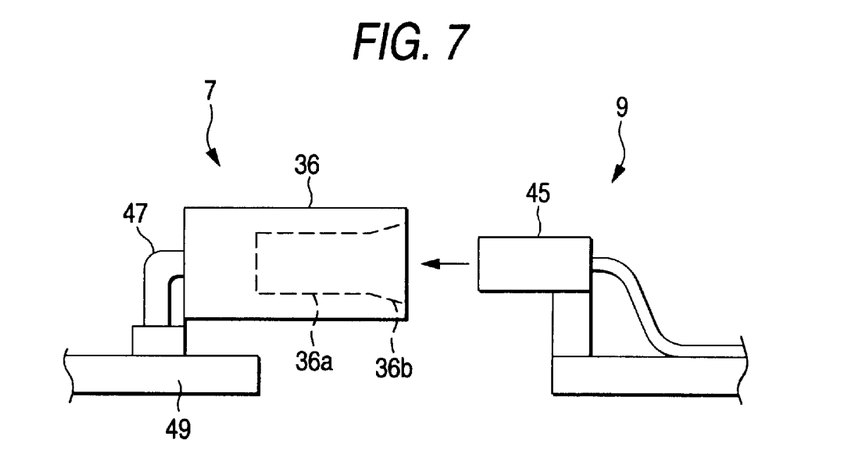
FIG. 7 is a schematic representation showing a receiving connector provided in the module loading section, when a male connector of the optional module is connected to the receiving connector.

The detection switch 35 and the receiving connector 36 are provided at the downstream end of each module loading section 29, in the direction in which the optional module 9 is inserted. When the optional module 9 is inserted into the module loading section 29 while the flanges 39 and 41 are inserted into the respective guide rails 31 and 33, a predetermined contact section of the optional module 9 comes into contact with an actuation piece 35a of the detection switch 35 which is urged so as to project by means of a spring. The actuation piece 35a is pressed against the spring force by means of the optional module 9, thereby turning on the detection switch 35. As a result, the central control section 17 detects insertion of the optional module 9 into the module loading section 29. As shown in FIG. 7, a male connector 45 provided on the optional module 9 is inserted and connected to the receiving connector 36, which is a female connector provided on the center module 7. Thus, the optional module 9 is electrically connected to the center module 7.

A fan-shaped guide 36b is formed along an opening section of a male connector receiving recess 36a of the receiving connector 36 and permits smooth fitting of the male connector 45 of the optional module 9 into the male connector receiving recess 36a.

The receiving connector 36 is electrically connected to a circuit board 49 provided in the center module 7, by way of an electrical connection member 47 which has a conducting portion made of a metal plate having appropriate hardness and is formed from a connection cable. Further, the receiving connector 36 is supported by means of the electrical connection member 47 mounted on the circuit board 49. The electrical connection member 47 possesses appropriate hardness and flexibility. Even if there is a positional deviation between the receiving connector 36 and the male connector 45 at the time of insertion of the optional module 9, the positional deviation may be absorbed by means of flexion of the electrical connection member 47, thereby preventing concentration of stress on the connectors 36 and 45.

A cover 51 is provided on the surface of the optional module 9—which faces outside when the module 9 is inserted into the center module 7—and closes an opening of each module loading section 29. The optional module 9 inserted into the module loading section 29 is fixed to the center module 7 by screwing the cover 51 on the casing 23 through use of screws 53.

The optional module 9 is removed by being withdrawn from the module loading section 29. When the optional module 9 is removed, the receiving connector 36 is disengaged from the male connector 45. The actuation piece 35a of the detection switch 35 pressed by means of the optional module 9 protrudes by means of the spring force and switches to an off state. As a result, the central control section 17 detects removal of the optional module 9 from the module loading section 29.

Although in the present embodiment a module loading section for receiving an unillustrated CD player module is not formed in the center module 7, the module loading section for receiving the CD player module may also be formed, as are the other module loading sections 29. In this case, in the front surface 7a of the center module 7 there is formed a CD insert port which is in mutual communication with the CD insert port of a CD player inserted into the center module 7.

The liquid crystal display section 13 provided on the center module 7 is arranged so as to display a television image received by the television tuner module 9a, a road map screen prepared for car navigation purposes by the car navigation unit 3, road traffic information (VICS information) received by the VICS module 9c, and visual information required to actuate the on-vehicle unit 1.

The input receiving section 15 receives operations for actuating the on-vehicle unit 1. The power supply unit: 19 supplies power to the overall on-vehicle unit 1.

The central control section 17 comprises a CPU 17a and memory 17b formed from ROM. On the basis of an instruction entered by way of the input receiving section 15, the central control section 17 controls the radio receiving unit 3, the car navigation unit 5, various optional modules 9a to 9c inserted into the center module 7, and an unillustrated air conditioner connected to the on-vehicle unit 1. The central control section 17 also has a function of indicating on the liquid crystal display 13 visual information required to activate the ratio receiving unit 3, the car navigation unit 5, the amplifying unit 21, the optional modules 9, and an air conditioner.

Figure 8:
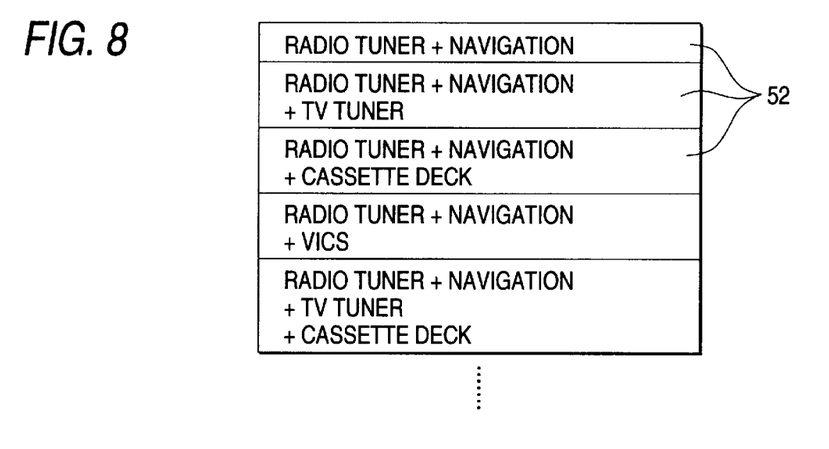
FIG. 8 is a table showing the contents of a control program stored in memory of a central control section provided in the on-vehicle unit shown in FIG. 1.

The central control section 17 has a plurality of control modes which can be switched according to the presence or absence of the optional module 9 in the module loading section 29 as well as according to a combination of the optional modules 9 inserted into the module loading sections 29. As shown in FIG. 8, a plurality of control programs 52 corresponding to the types of combinations of the optional modules 9 are recorded on the memory 17b so as to enable the central control section 17 to cope with a situation in which no optional module 9 is inserted into the center module 7 or in which the optional modules 9 capable of being attached to the on-vehicle unit 1 are inserted into the center module 7 in all possible combinations.

Upon detection of the turn-on or turn-off of the detection switch 35 provided in the module loading section 29, the CPU 17a recognizes the presence or absence of the optional module 9 in the module loading section 29 and a combination. of the optional modules 9 inserted into the module loading sections 29 and switches the control mode of the central control section 17 by reading from the memory 17b a control program 52 corresponding to the result of such recognition.

The individual input keys 15a and 15b of the input receiving section 15 are assigned by means of the central control section 17 instructions required to activate the radio receiving unit 3, the car navigation unit 5, the optional module 9, and an air conditioner. According to the presence or absence of the optional module 9 in the module loading section 29 and the combination of the optional modules 9 inserted into the module loading sections 29, the control mode of the central control section 17 is switched, which in turn changes the instructions assigned to the input keys.

Figure 9:
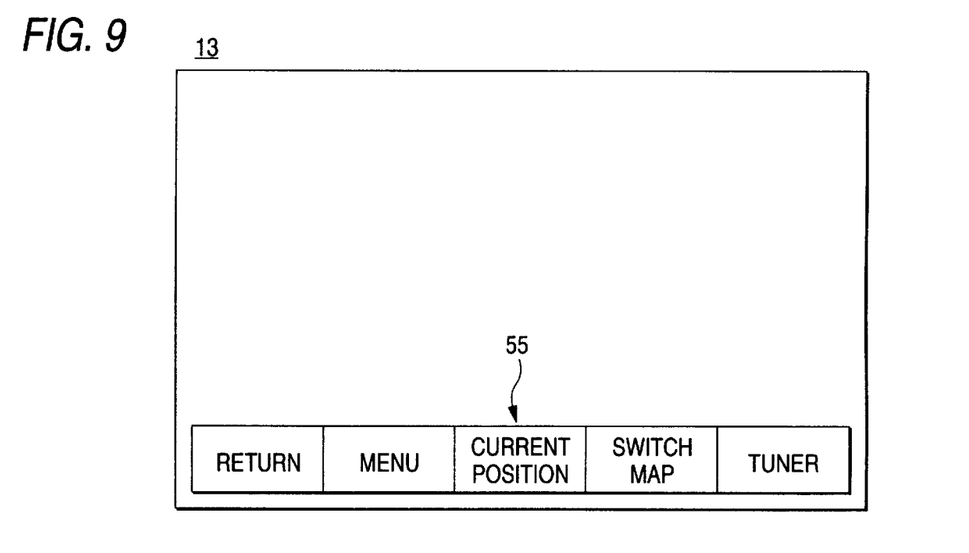
FIG. 9 is an illustration showing a liquid crystal display provided on the on-vehicle unit shown in FIG. 1 while instructions assigned to individual input keys of an input receiving section are indicated.
Figure 10:
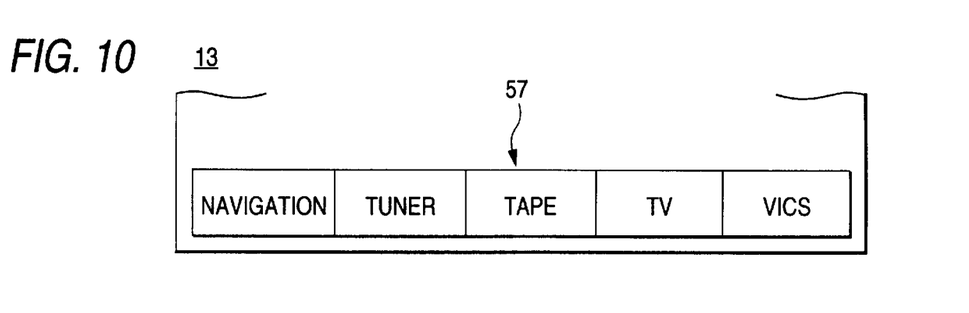
FIG. 10 is an illustration showing a liquid crystal display provided on the on-vehicle unit shown in FIG. 1 while instructions assigned to individual input keys of an input receiving section are indicated.

As shown in FIG. 9, display contents 55 representing the instructions assigned to the input keys 15a and 15b of the input receiving section 15 are displayed on the liquid crystal display 13, by means of the central control section 17, so as to correspond to the layout of the input keys 15a and 15b. As shown in FIG. 10, according to the presence or absence of the optional module 9 in the module loading section 29 and the combination of the optional modules 9 inserted into the module loading sections 29, the control mode of the central control sectin 17 is switched, and the instructions assigned to the input keys 15a and 15b are changed, which in turn changes the display contents 57 to other contents representing the instructions to which the previous instructions were changed.

The radio receiving unit 3 built in the center module 7 is intended to receive an FM radio broadcast and an AM radio broadcast. Under control of the central control section 17, the radio receiving unit 3 outputs to speakers 53 an audio signal of the thus-received radio broadcast by way of the amplification unit 21.

Under control of the central control section 17, the car navigation unit 5 performs various processing operations required to effect car navigation. The processing operations contain a receiving operation for receiving positional information required to calculate a vehicle position transmitted from a satellite; a reading operation for reading map information from CD-ROM by way of a CD-ROM driver provided in the car navigation unit 5; a road guide processing operation in which predetermined information processing for road guide purpose is performed on the basis of the positional information, map information, and the road traffic information received by the VICS module 9c to be described later, and in which navigation information such as a road map screen, a car position, and an optimum route is displayed on the liquid crystal display 13 by controlling the display contents of the liquid crystal display 13 by way of the central control section 17; and a processing operation for voice-guiding the direction in which the vehicle is traveling by way of the amplification unit 21 and the speakers 53.

Under control of the central control section 17, the television tuner module 9a of the optional modules 9 receives a television broadcast and displays the thus-received television image on the liquid crystal display 13 by way of the central control section 17. Further, an audio signal is output to the speakers 53 by way of the amplification unit 21.

Under control of the central control section 17, the cassette deck module 9b reproduces audio information recorded on a cassette tape and outputs the thus-reproduced audio signal to the speakers 53 by way of the amplification unit 21. The VICS module 9c receives road traffic information transmitted from the outside of the vehicle in the form of an FM multiplex broadcast, a radio beacon signal, or an optical beacon signal and transmits the thus-received information to the car navigation unit 5.

Under control of the central control section 7, an unillustrated CD player module reproduces audio information stored in CD-ROM and outputs the thus-reproduced information to the speakers 53 by way of the amplification unit 21.

As mentioned above, according to the present embodiment, various functions may be readily added to or removed from the on-vehicle unit 1 by removal or attachment of the optional module 9 from and to the center module 7.

As mentioned above, all the optional modules 9 are inserted into the module loading sections 29 of the center module 7. Therefore, even if new functions are added to the on-vehicle unit 1, there is no need to provide additional new wiring to the on-vehicle unit 1, which would otherwise be required by a conventional on-vehicle unit which requires additional separate units. Accordingly, the on-vehicle unit 1 according to the present embodiment enables easy addition of functions.

Further, the removal and attachment of the optional module 9 from and to the module loading section 29 are detected by means of the detection switch 35. In association with removal and attachment of the optional module 9, the control mode of the central control section 17 is switched to a control mode corresponding to the presence or absence of the optional module 9 in the module loading section 29 and corresponding to the combination of the optional modules 9 inserted into the module loading sections 29. Therefore, there is no need to take the trouble to switch the control mode of the central control section 17, thus facilitating operations required to remove or attach the optional module 9 from and to the center module 7.

The instructions assigned to the individual input keys 15a and 15b of the input receiving section 15 are changed according to the presence or absence of the optional module 9 in the module loading section 29 as well as according to the combination of the optional modules 9 inserted into the module loading sections 29. Accordingly, even if the optional module 9 is added to or removed from the center module 7, it is possible to activate the radio receiving unit 3, the car navigation unit 5, and the optional modules 9a to 9c by way of the input keys 15a and 15b without involving a change in the number and layout of input keys 15a and 15b of the input receiving section 15.

Further, the instructions assigned to the individual input keys 15a and 15b are displayed on the liquid crystal display 13 so as to correspond to the layout of the input keys 15a and 15b. The on-vehicle unit 1 has the advantage of being able to cope with a change in the instructions assigned to the input keys 15a and 15b resulting from removal or attachment of the optional module 9 from and to the center module 7, by solely changing the display contents of the liquid crystal display 13.

In a conventional on-vehicle unit into which various independently-manufactured units are assembled, there is a need to provide a power supply unit to each of the units, thereby rendering the units bulky. In contrast, according to the present embodiment, various optional modules 9 are fitted to the center module 7, as required. With such a configuration, the power supply unit 19, the central control section 17, the liquid crystal display 13, and the amplification unit 21 can be shared among the radio receiving unit 3, the car navigation unit 5, and the optional modules 9. Consequently, the on-vehicle unit 1 can be made compact and inexpensive correspondingly.

Figure 11:
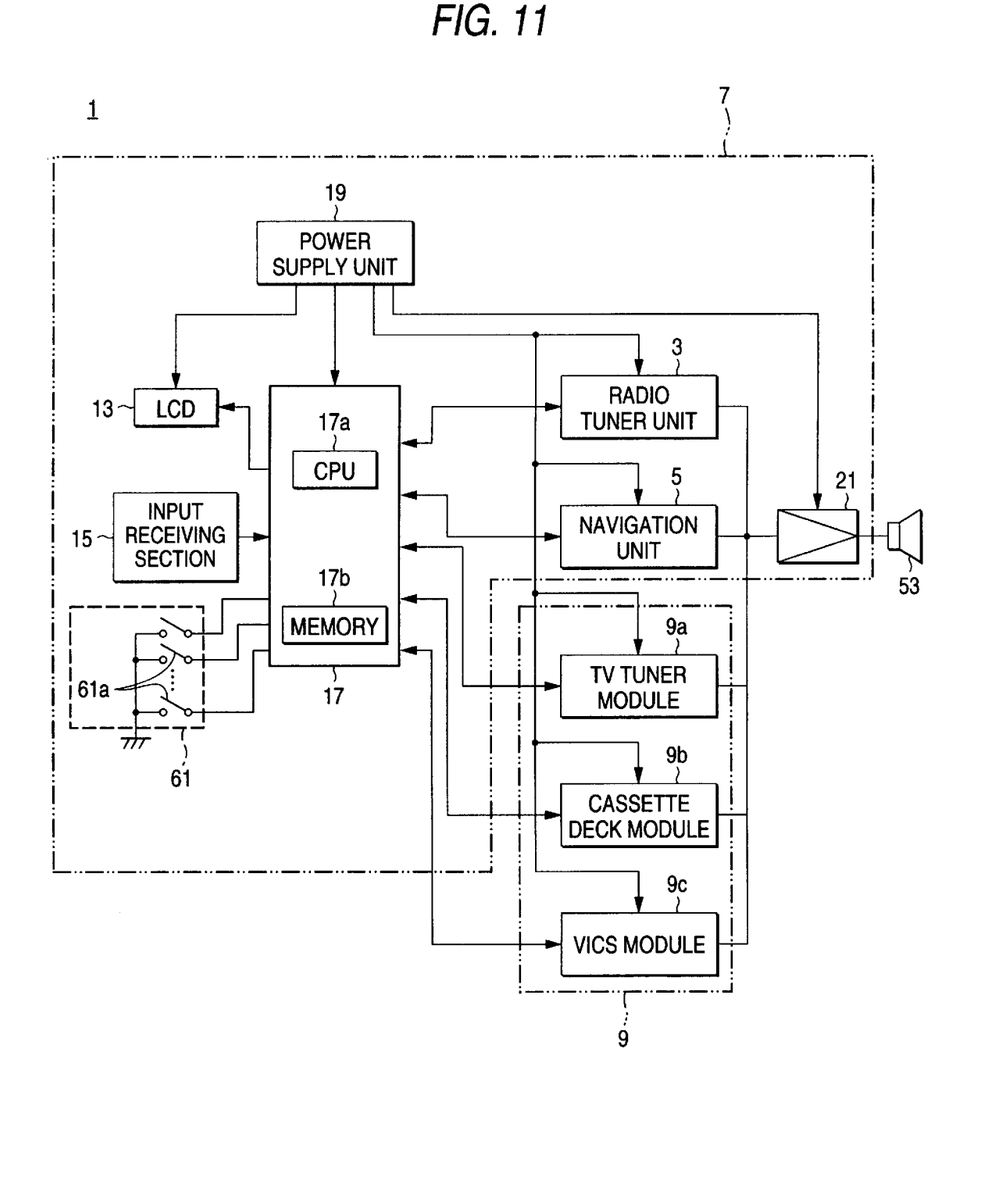
FIG. 11 is a block diagram showing a first modification of the on-vehicle unit shown in FIG. 1.

FIG. 11 is a block diagram showing a first modification of the on-vehicle unit 1 according to the present embodiment. The first modification is identical with the on-vehicle unit 1 according to the first embodiment, except for a dip switch (input means) 61 being used for switching the control mode of the central control section 17 in place of the detection switch 35 for detecting the removal and attachment of the optional module 9. The same reference numerals are assigned to the elements which are also used in the on-vehicle unit 1, and repetition of their explanations will be omitted here.

The dip switch 61 comprising a plurality of switches 61a is provided on the circuit board 49 within the center module 7 and on side surfaces 7b and 7c of the center module 7. The individual switches 61a of the dip switch 61 are electrically connected to the CPU 17a of the central control section 17. The signal input to the CPU 17a is switched between a high level and a low level, in association with the turn-on or turn-off of each of the switches 61a.

For example, the switches 61a of the dip switch 61 are provided so as to establish a one-to-one correspondence between the switches 61a and the module loading sections 29. When the optional module 9 is inserted into any of the module loading section 29, the switch 61a corresponding to the module loading section 29 is turned on, thereby notifying the central control section 17 of the optional module 9 being inserted into the module loading section 29.

In this way, so long as the switch 61a is switched between an ON state and an OFF state according to whether or not the optional module 9 is inserted into the center module 7, the central control section 17 recognizes the presence or absence of the optional module 9 in the module loading section 29 and the combination of the optional modules 9 that are loaded. As a result, as in the case of the on-vehicle unit 1, the control mode of the central control section 17 is switched to a control mode corresponding to the result of such recognition.

In the present embodiment, the switches 61a of the dip switch 61 are provided so as to establish a one-to-one correspondence between the switches 61a and the module loading sections 29. Alternatively, the types of combinations of the optional modules 9 to be loaded may be coded into binary numbers, and the central control section 17 may recognize the presence or absence of the optional module 9 in the module loading section 29 and the combination of the optional modules 9 by switching the switch 61a between an ON state and an OFF state so as to correspond to the coded number.

According to the first modification, the control mode of the central control section 17 can be switched by means of the dip switch 61 specifically designed for switching a control mode, according to removal and attachment of the optional module 9 from and to the center module 7, thereby enabling easy switching of the control mode.

In a second conceivable modification of the on-vehicle unit 1 according to the present embodiment, the control mode of the central control section 17 may be switched through predetermined input operations by way of the input keys 15*a* and 15*b* of the input receiving section 15.

In this case, a plurality of input operations for the purpose of switching a control mode—which are to be input by way of the input keys 15*a* and 15*b* of the input receiving section 15—are registered in the memory 17*b* of the central control section 17 so as to correspond to the types of combinations of the optional modules 9 to be loaded. When mode switching operations are entered by way of the input receiving section 15, the central control section 17 switches the control mode to a control mode corresponding the thus-entered mode switching operations, as in the case of the on-vehicle unit 1.

The mode switching operations must be set so as to prevent faulty operations of the radio receiving unit 3, the car navigation unit 5, and the optional modules 9*a* to 9*c*. For example, when the input keys 15*a* and 15*b* assigned instructions to activate the radio receiving unit 3 are pressed while the input keys 15*a* and 15*b* assigned instructions to automatically activate an air-conditioner are being pressed, the control mode of the central control section 17 can be switched to a control mode corresponding to a case where only the television tuner module 9*a* is inserted into the center module 7 as the optional module 9.

According to a second modification of the present embodiment, the control mode of the central control section 17 can be switched in association with removal or attachment of the optional module 9 from and to the center module 7 by way of the input receiving section 15 through which the radio receiving unit 3, the car navigation unit 5, and the optional modules 9*a* to 9*c* are operated. Therefore, there is no need to provide a dip switch 61 specifically designed for changing the control mode of the central control section 17, thus simplifying the configuration of the on-vehicle unit.

Figure 12:
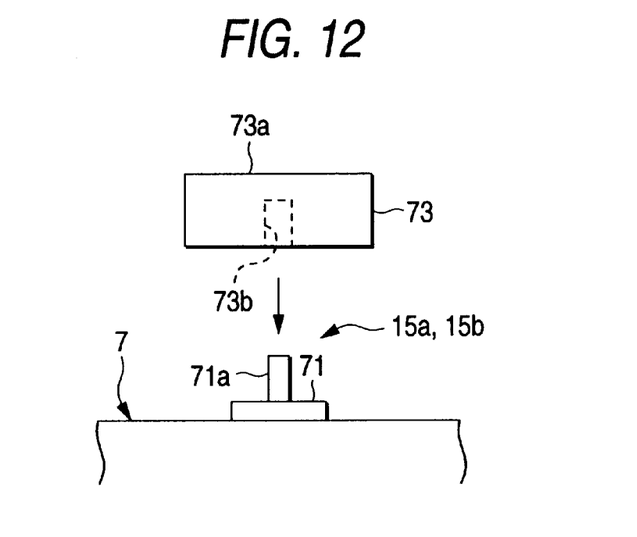
FIG. 12 is a schematic representation showing a modification of an input key provided in the input receiving section of the on-vehicle unit shown in FIG. 5.

In the foregoing embodiment, in a case where the instructions assigned to the input keys 15*a* and 15*b* of the input receiving section 15 are changed in association with the removal or attachment of the optional module 9 from and to the center module 7, the on-vehicle unit cope with such a change in the instructions by changing the display contents 55 and 57 indicating the instructions to be displayed on the liquid crystal display 13. Alternatively, as shown in FIG. 12, the instructions assigned to the input keys 15*a* and 15*b* are each written on the front surface 73*a* of the actuation section 73 removably attached to the key body 71 of the respective input keys 15*a* and 15*b*. In association with a change in the instruction assigned to the input key, the actuation section 73 may be replaced with another actuation section 73. The actuation section 73 is attached to the center module 7 by press-fitting the actuation piece 71*a* of the key body 71 into a fixing hole 73*b* formed in the reverse surface of the actuation section 73.

As a result, in a case where the instructions assigned to the input keys 15*a* and 15*b* of the input receiving section 15 are changed in association with the removal or attachment of the optional module 9 from and to the center module 7, the on-vehicle unit can cope with a change in the instructions by sole replacement of the actuation section 73 of each of the input keys 15*a* and 15*b* with the actuation section 73 on which is written a post-change instruction.

Further, in the present embodiment, in a case where the instructions assigned to the input keys 15*a* and 15*b* of the input receiving section 15 are changed in association with the removal or attachment of the optional module 9 from and to the center module 7, the on-vehicle unit copes with such a change in the instructions by changing the display contents 55 and 57 representing instructions to be displayed on the liquid crystal display. Alternatively, unillustrated seals—on which are written instructions assigned to the input keys 15*a* and 15*b* —are affixed on the actuation section of each of the input keys 15*a* and 15*b* or around the respective input keys 15*a* and 15*b*. If there is a change in the instructions, a seal may be changed to another seal on which is written a post-change instruction.

As a result, in a case where the instructions assigned to the input keys 15*a* and 15*b* of the input receiving section 15 are changed in association with the removal or attachment of the optional module 9 from and to the center module 7, the on-vehicle unit can readily cope with a change in the instructions by changing solely the seal.

Figure 13:
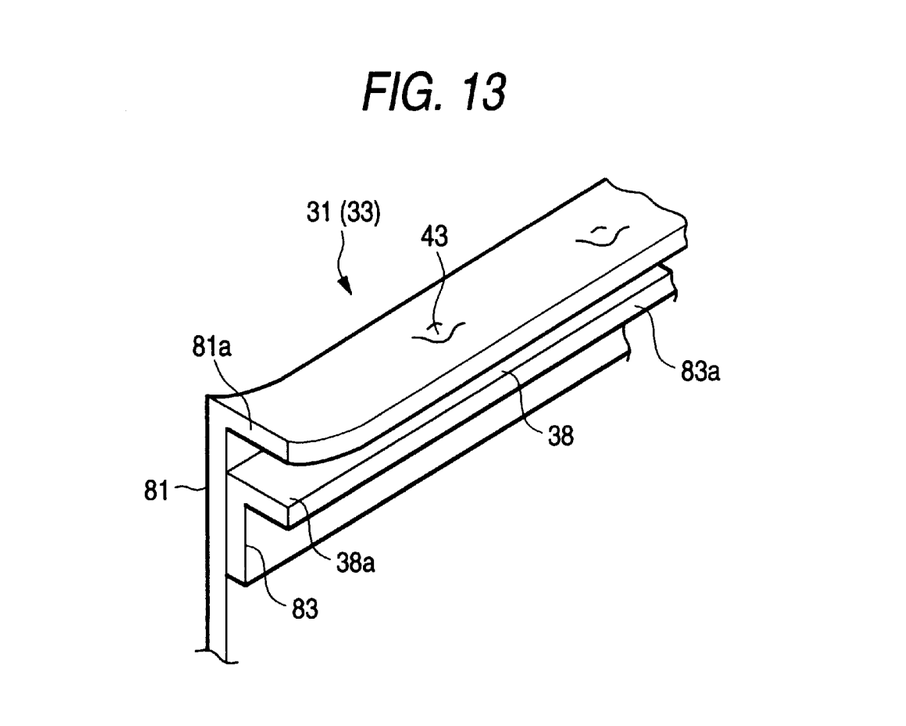
FIG. 13 is a perspective view showing a modification of the guide rail provided on the on-vehicle unit shown in FIG. 1.

As show in FIG. 4, in the present embodiment, the three sub-divisions formed in the front end of the metal plate 37 are folded to thereby form the guide rails 31 and 33. In contrast, as shown in FIG. 13, each of the guide rails 31 and 33 may be formed by screwing a second L-shaped holding member 83 on the interior surface of a first L-shaped holding member 81.

A folded portion 81*a* of the first holding member 81 of each of the thus-formed guide rails 31 and 33 is folded slightly inward of the module loading section 29. As in the case of the intermediate sub-division 37*c* of the metal plate 37, the folded portion 81*a* is tilted slightly downwardly, and the plurality of protuberances 43 are formed on the folded portion 81*a* so as to protrude in a downward direction. The flanges 39 and 41 of the optional module 9 are retained while being effectively pressed against the second holding member 83 by means of the folded portion 81*a*.

The groove-shaped retaining section 38 is formed by combination of the folded portion 81*a* and a folded portion 83*a* of the second holding member 83 folded at right angles. As in the case of the previously-described holding section 38, an opening 38*a* of the retaining section 38 is formed so as to fan out in the direction in which the flanges 39 and 41 are inserted, thereby facilitating insertion of the flanges 39 and 41.

The present embodiment has been described, in which the central control section 17 is separated from the car navigation unit 5. In effect, in terms of simplification, an operation processing section which is provided in the car navigation unit 5 and performs various operations required to effect car navigation should preferably perform various arithmetic operations for car navigation purposes and the control operations of the central control section 17.

What is claimed is:

1. An on-vehicle unit installed in a vehicle dashboard, the unit comprising:

a center module which incorporates therein at least one built-in unit having a predetermined function, has in at least one portion thereof a module loading section, and permits insertion or removal of at least one type of optional module having a predetermined function differing from the function of the at least one built-in unit, the at least one built-in unit in the center module includes a radio tuner unit having the function of receiving a radio broadcast and a navigation unit having the function of performing a predetermined road guiding operation;

input receiving means which is provided in the center module and receives predetermined inputs by way of operation; and central control means which is provided in the center module and controls the at least one built-in unit and the optional module inserted into the module loading section, according to an operation input entered by way of the input receiving means, wherein the central control means has a plurality of control modes which can be switched according to the presence or absence of the optional module in the module loading section as well as according to a combination of the optional modules to be inserted into the module loading, section, the optional module being selected from a television tuner module having the function of receiving a television broadcast, a cassette deck module having the function of reproducing information recorded on a cassette tape and a navigation module having the function of receiving navigation information transmitted from an outside of the vehicle, and a disk player module having the function of reproducing the information recorded on a disk, the center module having a plurality of module loading sections capable of receiving these optional modules.

2. The on-vehicle unit as defined in claim 1, wherein the type of optional module to be inserted into the module loading section is determined beforehand for each module loading section; the vehicle unit further comprises module detection means for detecting removal and insertion of the corresponding optional module from and into the module loading section of the center module; on the basis of a signal delivered from the module detection means, the central control means recognizes absence or presence of the optional module in the module loading section and the combination of optical modules inserted into the module loading section; and the control mode of the central control means is switched to a control mode corresponding to the result of recognition, from among the plurality of control modes.

3. The on-vehicle unit as defined in claim 1, wherein, in addition to the input receiving means, the on-vehicle unit further comprises input means which causes the central control means to recognize the presence or absence of the optional module in the module loading section and the combination of optional modules inserted into the module loading section; on the basis of a signal delivered from the module detection means, the central control means re cognizes absence or presence of the optional module in the module loading section and the combination of optional modules inserted into the module loading section; and the control mode of the central control means is switched to a control mode corresponding to the result of recognition, from among the plurality of control modes.

4. The on-vehicle unit as defined in claim 1, wherein a plurality of mode switch operations, which are to be input by way of the input receiving means for the purpose of switching the control mode, are registered in the central control means in advance; and, in response to the mode switch operation entered by way of the input receiving means, the control mode is switched to the control mode corresponding to the input content, from among the plurality of control modes.

5. An on-vehicle unit installed in a vehicle dashboard, the unit comprising:

a center module which incorporates therein at least one built-in unit having a predetermined function, has in at least one portion thereof a module loading section, and permits insertion or removal of at least one type of optional module having a predetermined function differing from the function of the built-in unit;

input receiving means which is provided in the center module and receives predetermined inputs by way of operation;

central control means which is provided in the center module and controls the at least one built-in unit and the optional module inserted into the module loading section, according to an operation input entered by way of the input receiving means; and input means which causes the central control means to recognize the presence or absence of the optional module in the module loading section and a combination of optional modules inserted into the module loading section, wherein the central control means has a plurality of control modes which can be switched according to the presence or absence of the optional module in the module loading section as well as according to a combination of the optional modules to be inserted into the module loading section, the central control means recognizes absence or presence of the optional module in the module loading section and the combination of optional modules inserted into the module loading section on the basis of a signal delivered from the input means, and the control mode of the central control means is switched, from among the plurality of control modes, to a control mode corresponding to the result of recognition, further wherein the input receiving means have a plurality of input keys which are allocated, by means of the central control means, to predetermined instructions for the purposes of activating the at least one built-in unit having a predetermined function beforehand and the optional module inserted into the module loading section, and the central control means changes instructions to the individual input keys in association with switching of the control mode, according to the presence or absence of the optional module in the module loading section as well as according to the combination of the optional modules to be inserted into the module loading section.

6. The on-vehicle unit as defined in claim 5, wherein the on-vehicle unit further comprises display means whose display is controlled by means of the central control means; and the central control means indicates on the display means the instructions assigned to the individual keys so as to correspond to the layout of the input keys.

7. The on-vehicle unit as defined in claim 5, wherein the instruction assigned to each input key is written on an actuation section removably attached to the body of each input key.

8. The on-vehicle unit as defined in claim 5, wherein a seal on which is written the instruction attached to the input key is affixed onto the actuation section of each input key or the circumference of each input key.

9. The on-vehicle unit as defined in claim 5, wherein the at least one built-in unit in the center module includes a radio tuner unit having the function of receiving a radio broadcast and a navigation unit having the function of performing a predetermined road guiding operation, the optional module being selected from a television tuner module having the function of receiving a television broadcast, a cassette deck module having the function of reproducing information recorded on a cassette tape, a VICS module having the function of receiving VICS information transmitted from an outside of the vehicle, and a CD player module having the function of reproducing the information recorded on a CD the center module having a plurality of module loading sections capable of receiving these optional modules.

10. An on-vehicle unit installed in a vehicle dashboard, the unit comprising:

a center module which incorporates therein at least one built-in unit having a predetermined function, has in at least one portion thereof a module loading section, and permits insertion or removal of at least one type of optional module having a predetermined function differing from the function of the at least one built-in unit;

input receiving means which is provided in the center module and receives predetermined inputs by way of operation;

central control means which is provided in the center module and controls the at least one built-in unit and the optional module inserted into the module loading section, according to an operation input entered by way of the input receiving means; and a plurality of mode switch operations, which are to be input by way of the input receiving means for the purpose of switching a control mode, are registered in the central control means in advance, wherein the central control means has a plurality of control modes which can be switched according to the presence or absence of the optional module in the module loading section as well as according to a combination of the optional modules to be inserted into the module loading section, and in response to the mode switch operation entered by way of the input receiving means, the control mode is switched from among the plurality of control modes to a control mode corresponding to the input content, further wherein the input receiving means have a plurality of input keys which are allocated, by means of the central control means, to predetermined instructions for the purposes of activating the at least one built-in unit beforehand and the optional module inserted into the module loading section, and the central control means changing the instructions to the individual input keys in association with switching of the control mode, according to the presence or absence of the optional module in the module loading section as well as according to the combination of the optional modules to be inserted into the module loading section.

11. The on-vehicle unit as defined in claim 10, wherein the on-vehicle unit further comprises display means whose display is controlled by means of the central control means; and the central control means indicates on the display means the instructions assigned to the individual keys so as to correspond to the layout of the input keys.

12. The on-vehicle unit as defined in claim 10, wherein the instruction assigned to each input key is written on an actuation section removably attached to the body of each input key.

13. The on-vehicle unit as defined in claim 10, wherein a seal on which is written the instruction attached to the input key is affixed onto the actuation section of each input key or the circumference of each input key.

14. The on-vehicle unit as defined in claim 10, wherein the at least one built-in unit in the center module includes a radio tuner unit having the function of receiving a radio broadcast and a navigation unit having the function of performing a predetermined road guiding operation, the optional module being selected from a television tuner module having the function of receiving a television broadcast, a cassette deck module having the function of reproducing information recorded on a cassette tape, a VICS module having the function of receiving VICS information transmitted from an outside of the vehicle, and a CD player module having the function of reproducing the information recorded on a CD, the center module having a plurality of module loading sections capable of receiving these optional modules.

15. An on-vehicle unit installed in a vehicle dashboard, the unit comprising:

a center module which incorporates therein at least one built-in unit having a predetermined function, has in at least one portion thereof a module loading section, and permits insertion or removal of at least one type of optional module having a predetermined function differing from the function of the built-in unit, the at least one built-in unit including a radio tuner unit having the function of receiving a radio broadcast and a navigation unit having the function of performing a predetermine road guiding operation, the optional module being selected from a television tuner module having the function of receiving a television broadcast, a cassette deck module having the function of reproducing information recorded on a cassette tape, a VICS module having the function of receiving VICS information transmitted from an outside of the vehicle, and a CD player module having the function of reproducing the information recorded on a CD, the center module having a plurality of module loading sections capable of receiving these optional modules;

input receiving means which is provided in the center module and receives predetermined inputs by way of operation; and control means which is provided in the center module and controls the at least one built-in unit and the optional module inserted into the module loading section, according to an operation input entered by way of the input receiving means.

16. An on-vehicle unit installed in a vehicle dashboard, the unit comprising:

a center module which incorporates therein at least one built-in unit having a predetermined function, has in at least one portion thereof a module loading section, and permits insertion or removal of at least one type of optional module having a predetermined function differing from the function of the at least one built-in unit, the type of optional module to be inserted into the module loading section being determined beforehand for each module loading section;

input receiving means which is provided in the center module and receives predetermined inputs by way of operation;

module detection means for detecting removal and insertion of the optional module from and into the module loading section of the center module; and central control means which is provided in the center module and controls the at least one built-in unit and the optional module inserted into the module loading section, according to an operation input entered by way of the input receiving means, wherein the central control means has a plurality of control modes which can be switched according to the presence or absence of the optional module in the module loading section as well as according to a combination of the optional modules to be inserted into the module loading section, the central control means recognizes absence or presence of the optional module in the module loading section and the combination of optional modules inserted into the module loading section on the basis of a signal delivered from the module detection means, and the control mode of the central control means is switched, from among the plurality of control modes, to a control mode corresponding to the result of recognition, wherein the input receiving means have a plurality of input keys which are allocated, by means of the central control means, to predetermined instructions for the purposes of activating the at least one built-in unit having a predetermined function beforehand and the optional module inserted into the module loading section, and the central control means changes the instructions to the individual input keys in association with switching of the control mode, according to the presence or absence of the optional module in the module loading section as well as according to the combination of the option modules to be inserted into the module loading section.

17. The on-vehicle unit as defined in claim 16, wherein the on-vehicle unit further comprises display means whose display is controlled by means of the central control means; and the central control means indicates on the display means the instructions assigned to the individual keys so as to correspond to the layout of the input keys.

18. The on-vehicle unit as defined in claim 17, wherein a seal on which is written the instruction attached to the input key is affixed onto the actuation section of each input key or the circumference of each input key.

19. The on-vehicle unit as defined in claim 16, wherein the instruction assigned to each input key is written on an actuation section removably attached to the body of each input key.

* * * * *